Patented Oct. 25, 1938

2,134,642

UNITED STATES PATENT OFFICE 2,134,642

AZO DYESTUFF AND PROCESS FOR THE MANUFACTURE THEREOF

Pierre Petitcolas, Rouen, and Robert Frédéric Michel Sureau, Mont St-Aignan, France, assignors to Compagnie Nationale de Matières Colorantes et Manufactures de Produits Chimiques du Nord Réunies, Etablissements Kuhlmann, Paris, France, a corporation of France No Drawing. Application July 28, 1937, Serial No. 156,178. In France August 12, 1936

10 Claims. (Cl. 260—193)

This invention relates to azo dyestuffs and process for the manufacture thereof.

It has been found according to the present invention that there are easily obtained the aryl esters of orthosulphanilic acid or of its substitution products of the general formula:

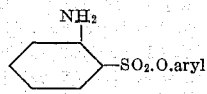

(in which the benzene nucleus substituted by the $NH_2$-group and also the other aryl nucleus may contain other substituents which do not impart solubility in water, substituents such as alkyl or alkoxy groups or halogen atoms), by reducing by any customary process the condensation products of ortho-nitro-benzene sulfonyl chloride or its substitution products with alkali-phenolates or their nuclear substitution products such for example as the alkali salts of the o-, m- and p-cresols, the o-, m-, p-chlorophenols, the di- and tri-chlorophenols, the mono-alkyl derivatives of hydroquinone or resorcinol or the like.

These condensations are carried out in the absence of water and either in the presence of excess of phenol or better in a neutral solvent such as benzene, toluene, chlorobenzene or the like.

The bases of the above general formula can be used as diazo constituents and constitute particularly valuable starting materials for the production of azo dyestuffs, in particular for the production on the fibre and in substance of azo dyestuffs insoluble in water by coupling with coupling components of substantive character, such as the arylides of o-hydroxy-carboxylic acids, acyl-acetic acids and others.

The dyestuffs obtained possess good fastness properties to chlorine, boiling, and above all remarkable fastness to light.

The production of these dyestuffs on the fibre can be carried out as regards the dyeing of cotton, viscose or other natural or artificial fibres by means of known processes with or without intermediate formation of nitros amines, diazo-amino compounds, diazo-sulphonates, Schiff bases and so on.

The dyestuffs produced in substance can be used for the dyeing of lacquers, varnishes, organic solvents, plastic masses, rubber and so on.

The following examples illustrate the invention:

Example 1

A mixture of 200 grams of phenol and 25 grams of pure caustic potash is heated to 190–200° C. to the complete elimination of the water formed. After cooling to about 100° C., there are introduced in small portions 90 grams of o-nitrobenzene-sulfonyl chloride. The temperature should not exceed 130–140° C. The reaction is practically instantaneous. After a few moments stirring the whole is poured with good agitation into 3000 ccs. of an alkaline solution containing 30 grams of caustic soda per litre. After filtration of the crystallized product and purification in alcohol the phenyl ester of o-nitro-benzene sulphonic acid of the following formula:

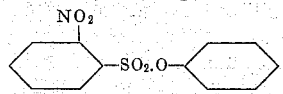

is produced in the form of white needles (M. P. 57°). By reduction by means of the customary processes there is obtained the phenyl-ester of o-sulphanilic acid (M. P. 71° after purification in alcohol).

Example 2

By working as in Example 1 but replacing the o-nitro-benzene-sulfonyl chloride by 1-chloro-3-nitro-4-benzene-sulfonyl-chloride there is obtained a condensation product, the phenyl-ester of 1-chloro-3-nitro-benzene-sulphonic acid (M. P. 82° after purification in alcohol), which, by reduction, gives the corresponding base (M. P. 103°) of formula:

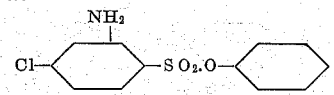

19 grams of this phenyl-ester are finely powdered and stirred for several hours at ordinary temperature into a mixture of 100 ccs. of hydrochloric acid of 20° Bé. and 20 ccs. of water. There is added a distinct excess of a 50% solution of sodium nitrite and the whole is stirred briskly for half an hour. The diazo solution is filtered and subjected to the addition of a concentrated solution of sodium fluo borate. The diazonium fluoborate crystallizes instantaneously in beautiful white plates which are centrifuged and can be dried at 50° C. For use it is ground with a mixture of naphthalene-2.7-disulphonic acid and aluminium sulphate in such a manner as to bring the content of the powder to 20% of free base.

By replacing in this example the phenol by p-cresol it is possible to prepare the p-cresyl-ester of p-chloro-o-nitrobenzene-sulphonic acid (M. P. 97–99°) of the formula:

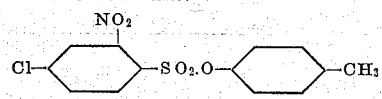

which, when reduced, gives the p-cresyl-ester of p-chloro-o-sulphanilic acid (M. P. 114° C.) of the formula:

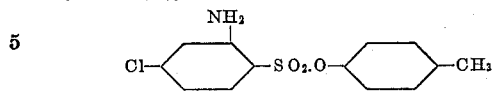

This latter can be diazotized in the same manner as above.

With p-chloro-phenol under the same conditions there is isolated the p-chloro-phenyl-ester of p-chloro-o-nitrobenzene-sulphonic acid (M. P. 90°) then the p-chloro-phenyl-ester of p-chloro-o-sulphanilic acid (M. P. 115°) of the formula:

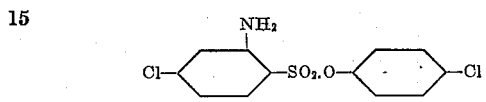

Example 3

25 grams of phenol and 12 grams of pure caustic potash are dissolved in 100 ccs. of ethyl alcohol. This solution of potassium phenate is poured into 500 ccs. of chloro-benzene and the mixture brought to boiling point with distillation of the water and the alcohol then of the chloro-benzene to the complete elimination of the water. After cooling to about 50° C. there are introduced 45 grams of 1-methyl-3-nitro-4-benzene-sulfonyl chloride. The reaction is rapid and causes a considerable increase of temperature. The whole is brought to boiling for some minutes and then the solvent driven off with steam. The phenyl ester of o-nitro-p-toluene sulphonic acid crystallizes easily. Purified from alcohol it is produced in the form of white needles (M. P. 101°).

By reduction there is obtained the phenyl-ester of p-methyl-o-sulphanilic acid (M. P. 94°) of the formula:

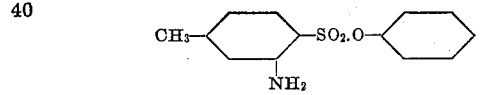

Under analogous conditions it is possible to produce—

(a) the o-chlorophenyl-ester of p-chloro-o-sulphanilic acid (M. P. 111°) of formula:

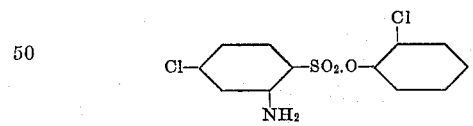

(b) the o-cresyl-ester of o-sulphanilic acid (M. P. 104°) (the corresponding nitro-derivative melts at 59° C.).

(c) the 2′.5′-dichlorophenyl-ester of p-chloro-o-sulphanilic acid (M. P. 123°) of formula:

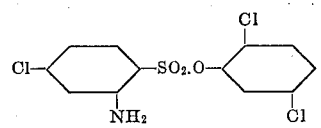

(the corresponding nitro-derivative melts at 130° C.).

(d) the 2′.4′6′-trichlorophenyl-ester of p-chloro-o-sulphanilic acid (M. P. 138°) of formula:

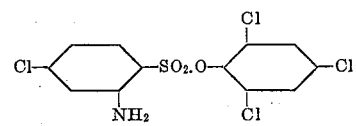

(the corresponding nitro derivative melts at 128° C.).

Example 4

2 grams of naphthylamide of 2.3-hydroxynaphthoic acid are pasted with 3 ccs. of denatured alcohol and 0.8 cc. of caustic soda of 34° Bé.; dilution is effected with 2 ccs. of cold water and there is obtained a clear solution to which is added 1 cc. of 33% formaldehyde. After standing for 5 minutes this solution is poured into 1 litre of cold water to which have previously been added 5.2 ccs. of caustic soda of 34° Bé. and 5 ccs. of sodium sulpho-ricinoleate 50%. 50 grams of cotton yarn are handled for half an hour at 25–30° C. in this impregnating bath then it is squeezed and developed immediately in a bath constituted by 1 litre of water in which have been dissolved 13 grams of the diazo-derivative such as is obtained in Example 2 starting from the phenyl-ester of 1-amino-5-chloro-benzene-2-sulphonic acid and containing 20% of free base.

The duration of the development is half an hour in the cold; the skein is rinsed, acidified, rinsed, soaped for half an hour at the boil in a bath containing 3 grams of Marseilles soap per litre, rinsed again and dried. A scarlet shade is obtained.

The table below indicates the shades obtained with different phenyl esters of o-sulphanilic acid or their derivatives on one hand and different coupling components on the other hand.

| Diazotization component | Coupling component | Shade on cotton |
| --- | --- | --- |
| Phenyl-ester of 1-amino-5-chloro-benzene-2-sulphonic acid. | Anilide of 2.3-hydroxynaphthoic acid | Reddish orange. |
| | m-Nitranilide of 2.3-hydroxynaphthoic acid | Orange. |
| | β-Naphthylamide of 2.3-hydroxynaphthoic acid | Scarlet. |
| | 5-chloro-2-toluidide of 2.3-hydroxynaphthoic acid | Orange. |
| | Para-anisidide of 2.3-hydroxynaphthoic acid | Reddish brown. |
| | o-Toluidide of 2.3-hydroxynaphthoic acid | Bright orange. |
| | α-Naphthylamide of 2.3-hydroxynaphthoic acid | Reddish brown. |
| | o-Anisidide of 2.3-hydroxynaphthoic acid | Orange. |
| | p-Chloro-o-anisidide of 2.3 hydroxynaphthoic acid | Do. |
| | 2.3 - hydroxynaphthoyl - 2.4 - dimethoxy - 5 - chloro -1 - aminobenzene. | Brown. |
| | Diacetoacetyl-o-tolidine | Yellow. |
| p-Cresyl-ester of 1-amino-5-chloro-benzene-2-sulphonic acid. | Anilide of 2.3-hydroxynaphthoic acid | Orange. |
| | m-Nitranilide of 2.3-hydroxynaphthoic acid | Do. |
| | β-Naphthylamide of 2.3-hydroxynaphthoic acid | Reddish orange. |
| | 5-chloro-2-toluidide of 2.3-hydroxynaphthoic acid | Orange. |
| | Para-anisidide of 2.3-hydroxynaphthoic acid | Brownish orange. |
| | o-Toluidide of 2.3-hydroxynaphthoic acid | Orange. |
| | α-Naphthylamide of 2.3-hydroxynaphthoic acid | Reddish orange. |
| | o-Anisidide of 2.3-hydroxynaphthoic acid | Orange. |
| | p-Chloro-o-anisidide of 2.3-hydroxynaphthoic acid | Do. |
| Do | 2.3-hydroxynaphthoyl-2.4-dimethoxy-5-chloro-1-aminobenzene. | Brown. |
| | Diacetoacetyl-o-tolidine | Yellow. |

| Diazotization component | Coupling component | Shade on cotton |
|---|---|---|
| Phenyl-ester of o-sulphanilic acid | Anilide of 2.3-hydroxynaphthoic acid | Orange. |
| | m-Nitranilide of 2.3-hydroxynaphthoic acid | Reddish orange. |
| | β-Naphthylamide of 2.3-hydroxynaphthoic acid | Do. |
| | 5-chloro-2-toluidide of 2.3-hydroxynaphthoic acid | Orange. |
| | Para-anisidide of 2.3-hydroxynaphthoic acid | Brownish orange. |
| | o-Toluidide of 2.3-hydroxynaphthoic acid | Orange. |
| | α-naphthylamide of 2.3-hydroxynaphthoic acid | Reddish orange. |
| | o-anisidide of 2.3-hydroxynaphthoic acid | Orange. |
| | p-chloro-o-anisidide of 2.3-hydroxynaphthoic acid | Do. |
| | 2.3-hydroxynaphthoyl-2.4-dimethoxy-5-chloro-1-aminobenzene. | Brown. |
| | Diacetoacetyl-o-tolidine | Greenish yellow. |

What we claim is:

1. Process for the manufacture of azo dyestuffs consisting in coupling the diazo-derivatives of aromatic amines of the general formula:

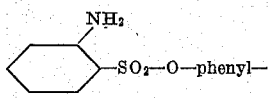

with a member of the group consisting of phenylamides of 2-3-hydroxynaphthoic acid, naphthylamide of 2-3 hydroxynaphthoic acid and the diacetoacetyl-o-tolidine.

2. Process for the manufacture of azo dyestuffs consisting in coupling the diazo-derivatives of aromatic amines of the general formula:

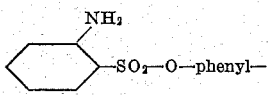

in which the benzene nucleus contains at least one member of the group consisting of halogen, alkyl and alcoxy groups with a member of the group consisting of phenylamides of 2-3-hydroxynaphthoic acid, naphthylamides of 2-3 hydroxynaphthoic acid and the diacetoacetyl-o-tolidine.

3. Process for the manufacture of azo dyestuffs consisting of coupling the diazo-derivatives of aromatic amines of the general formula:

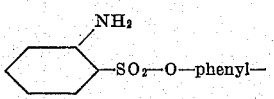

in which the benzene nucleus contains at least one member of the group consisting of halogen, alkyl and alcoxy groups with a member of the group consisting of phenylamides of 2-3-hydroxynaphthoic acid, naphthylamides of 2-3 hydroxynaphthoic acid and the diacetoacetyl-o-tolidine.

4. Process for the manufacture of azo dyestuffs consisting in coupling the diazo-derivatives of aromatic amines of the general formula:

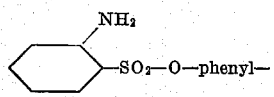

in which the benzene nucleus contains at least one member of the group consisting of halogen, alkyl and alcoxy groups with a member of the group consisting of phenylamides of 2-3-hydroxynaphthoic acid, naphthylamides of 2-3 hydroxynaphthoic acid and the diacetoacetyl-o-tolidine.

5. Process for the manufacture of azo dyestuffs consisting in coupling the diazo-derivatives of aromatic amines of the general formula:

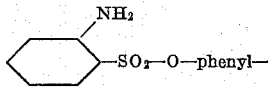

in which the benzene nucleus contains at least one member of the group consisting of halogen, alkyl and alcoxy groups with a member of the group consisting of phenylamides of 2-3-hydroxynaphthoic acid, naphthylamides of 2-3 hydroxynaphthoic acid and the diacetoacetyl-o-tolidine.

6. Azo dyestuffs obtained by the process according to claim 1.

7. Azo dyestuffs obtained by the process according to claim 2.

8. Azo dyestuffs obtained by the process according to claim 3.

9. Azo dyestuffs obtained by the process according to claim 4.

10. Azo dyestuffs obtained by the process according to claim 5.

PIERRE PETITCOLAS.
ROBERT FRÉDÉRIC MICHEL SUREAU.